United States Patent
Jung et al.

(10) Patent No.: US 10,616,580 B2
(45) Date of Patent: Apr. 7, 2020

(54) APPARATUS AND METHOD FOR ENCODING VIDEO

(71) Applicant: SAMSUNG ELECTRONICS CO., LTD., Suwon-si, Gyeonggi-Do (KR)

(72) Inventors: Young-Beom Jung, Seoul (KR); Jungyeop Yang, Seoul (KR); Hyuk Jae Jang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 3 days.

(21) Appl. No.: 16/011,674

(22) Filed: Jun. 19, 2018

(65) Prior Publication Data

US 2019/0158834 A1 May 23, 2019

(30) Foreign Application Priority Data

Nov. 17, 2017 (KR) .................. 10-2017-0154286

(51) Int. Cl.
| | | |
|---|---|---|
| *H04N 19/18* | (2014.01) | |
| *H04N 19/196* | (2014.01) | |
| *H04N 19/126* | (2014.01) | |
| *G06N 7/00* | (2006.01) | |
| *H04N 19/124* | (2014.01) | |
| *G06N 20/00* | (2019.01) | |

(52) U.S. Cl.
CPC ............. *H04N 19/126* (2014.11); *G06N 7/00* (2013.01); *G06N 20/00* (2019.01); *H04N 19/124* (2014.11); *H04N 19/18* (2014.11); *H04N 19/197* (2014.11)

(58) Field of Classification Search
CPC ............................ H04N 19/126; H04N 19/18
See application file for complete search history.

(56) References Cited

U.S. PATENT DOCUMENTS

| | | | | |
|---|---|---|---|---|
| 7,848,409 B2 * | 12/2010 | Wang | .................. | H04N 19/176 375/240.02 |
| 8,204,128 B2 * | 6/2012 | Huchet | ................ | H04N 19/176 375/240.18 |
| 8,351,721 B2 * | 1/2013 | Katou | .................. | H04N 19/105 382/232 |
| 8,472,741 B2 * | 6/2013 | Sakurai | .................. | H04N 5/775 382/190 |
| 9,270,990 B2 * | 2/2016 | Lee | ......................... | H04N 19/61 |
| 9,584,815 B2 * | 2/2017 | Kwon | ..................... | H04N 19/50 |
| 9,641,844 B2 * | 5/2017 | Kim | ....................... | H04N 19/61 |

(Continued)

FOREIGN PATENT DOCUMENTS

| | | |
|---|---|---|
| KR | 101356450 B1 | 2/2014 |
| KR | 101379185 B1 | 3/2014 |

(Continued)

*Primary Examiner* — Irfan Habib
(74) *Attorney, Agent, or Firm* — Volentine, Whitt & Francos, PLLC

(57) ABSTRACT

A video encoding apparatus includes at least one processor. The at least one processor is configured to adjust a size of a first quantization parameter with reference to a characteristic of quantization coefficients generated from input data by using the first quantization parameter, to determine the first quantization parameter of the adjusted size as a final quantization parameter, and to quantize the input data by using the final quantization parameter to generate output data.

17 Claims, 14 Drawing Sheets

(56) References Cited

U.S. PATENT DOCUMENTS

2014/0072048 A1* 3/2014 Ma .................. H04N 19/172
375/240.16
2018/0255301 A1* 9/2018 Zhao .................. H04N 19/176

FOREIGN PATENT DOCUMENTS

| KR | 20140072179 A | 6/2014 |
| KR | 101461365 B1 | 11/2014 |
| KR | 20150055040 A | 5/2015 |
| KR | 20170042235 A | 4/2017 |

* cited by examiner

APPARATUS AND METHOD FOR ENCODING VIDEO

CROSS-REFERENCE TO RELATED APPLICATIONS

This U.S. non-provisional patent application claims priority under 35 U.S.C. § 119 to Korean Patent Application No. 10-2017-0154286, filed on Nov. 17, 2017 in the Korean Intellectual Property Office, the disclosures of which are incorporated by reference herein in their entireties.

BACKGROUND

1. Field

Embodiments of the present disclosure relate to a method and an apparatus for processing an image. More particularly, embodiments of the present disclosure relate to a method and an apparatus for encoding a video.

2. Description of Related Art

Video encoding may refer to the process of generating encoded data having a smaller capacity than original data from image data or video data composed of a series of image data. Decoded data that are generated by decoding the encoded data or a bitstream may be the same as or different from original data depending on a video encoding manner. For example, data that are decoded from data encoded according to lossless compression may be the same as original data, but data that are decoded from data encoded according to lossy compression may be different from original data.

One of the principal problems associated with video encoding is the problem of reducing a difference between decoded data and original data while reducing the size of data encoded according to the lossy compression, that is, a bitrate of the bitstream.

SUMMARY

Embodiments of the present disclosure provide a method and an apparatus for selecting a quantization parameter efficiently.

The technical problem to be solved by embodiments of the present disclosure is not limited to the above-described technical problems, and other technical problems can be deduced from the following embodiments.

According to an exemplary embodiment, a video encoding apparatus may include at least one processor. The at least one processor may be configured to adjust a size of a first quantization parameter with reference to (based on) a characteristic of quantization coefficients generated from input data by using the first quantization parameter, to determine the first quantization parameter of the adjusted size as a final quantization parameter, and to quantize the input data by using the final quantization parameter to generate output data.

According to an exemplary embodiment, a video encoding method which is performed by at least one processor may include performing quantization on input data by using a first quantization parameter to generate quantization coefficients, adjusting a size of the first quantization parameter with reference to (based on) a characteristic of the quantization coefficients generated by using the first quantization parameter, determining the first quantization parameter of the adjusted size as a final quantization parameter, and quantizing the input data by using the final quantization parameter to generate output data.

According to an exemplary embodiment, a video encoding method which is performed by at least one processor may include determining at least one transformation unit associated with a coding unit, performing frequency transformation on pieces of residual data included in the at least one transformation unit to generate transformed coefficients associated with the at least one transformation unit, performing quantization on the transformed coefficients by using a first quantization parameter to generate quantization coefficients, adjusting a size of the first quantization parameter with reference to (based on) a characteristic of the quantization coefficients generated by using the first quantization parameter, to determine a final quantization parameter, and quantizing the transformed coefficients by using the determined final quantization parameter.

BRIEF DESCRIPTION OF THE FIGURES

The above and other objects and features of the inventive concepts described herein will become apparent by describing in detail exemplary embodiments thereof with reference to the accompanying drawings.

DETAILED DESCRIPTION

Below, embodiments of the present disclosure will be described in detail and clearly to such an extent that those (hereinafter referred to as "ordinary those") skilled in the art easily implement the inventive concepts described herein.

Below, the terms "unit" or "module" used in the specification may mean a hardware component or an electronic circuit such as a field programmable gate array (FPGA) or an application specific integrated circuit (ASIC). Such terms may also refer to a combination of software instructions executed by a hardware component or electronic circuit, as well as the hardware component or electronic circuit and/or a memory that stores the software instructions.

Figure 1:
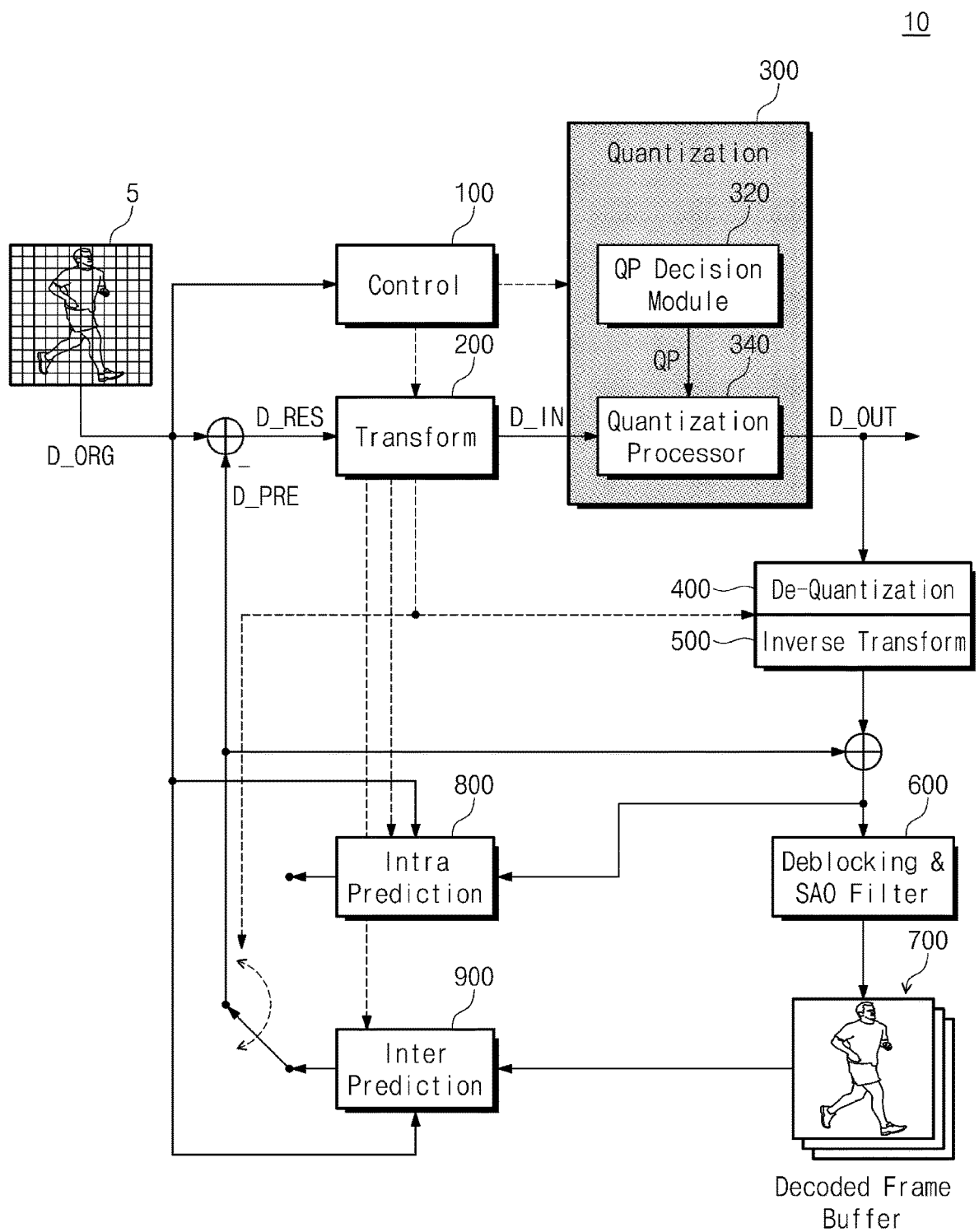
FIG. 1 illustrates a block diagram of a video encoding apparatus, according to an embodiment.

FIG. 1 illustrates a block diagram of a video encoding apparatus, according to an embodiment.

A video encoding apparatus 10 may be one of various apparatuses that process video data (or image data). According to an embodiment, the video encoding apparatus 10 may be of a type that includes a display to output video data. For example, the video encoding apparatus 10 may be a mobile phone, a desktop personal computer (PC), a laptop PC, a tablet PC, or the like. The video encoding apparatus 10 may also be of a type that includes a camera module to generate video data, such as a digital camera, a digital camcorder, a smartphone, or the like. Also, the video encoding apparatus 10 may be a server that performs video encoding for the purpose of transmitting data through a communication channel such as a network. Also, the video encoding apparatus 10 may be implemented with one or more semiconductor chips as a part included in the above-described apparatuses, and may include a computer-readable storage medium which stores software implemented with instructions executable by a processor, a central processing unit (CPU), a graphic processing unit (GPU), or the like for the purpose of performing video encoding is stored.

The video encoding apparatus 10 may include at least one processor. Modules illustrated in FIG. 1 may be implemented by one processor, and may be independently implemented with different processors, and may also be a combination of such processors and software executed by the processors, as well as memory that stores the software executed by the processors.

The video encoding apparatus 10 may generate encoded data (e.g., an encoded bitstream) by encoding original video data 5. A quantization parameter decision module 320 of a quantization module 300 may generate a quantization parameter QP corresponding to a block. For example, the quantization parameter QP may be generated to have different values for different respective blocks. The video encoding apparatus 10 according to an embodiment may include a control module 100, a transformation module 200, the quantization module 300, a de-quantization module 400, an inverse transformation module 500, a deblocking/SAO filter module 600 (sample adaptive offset filter module), a decoded frame buffer 700, an intra prediction module 800, and inter prediction module 900, and may include operation blocks to operate addition or subtraction of data.

The control module 100 may control video encoding. For example, the control module 100 may receive the original video data 5, and may send a control signal to other modules included in the video encoding apparatus 10 as illustrated by a dotted line.

The transformation module 200 may generate input data D_IN by transforming residual data D_RES. Residual data D_Res is data representing a difference between original data D_ORG and prediction data D_PRE. For example, the transformation module 200 may generate the input data D_IN by performing discrete cosine transform (DCT) on the residual data D_RES. Thus, the residual data D_RES of a spatial domain may be transformed to the input data D_IN of a frequency domain.

The quantization module 300 (or a quantizer) may obtain output data D_OUT by quantizing the input data D_IN. For example, the quantization module 300 may quantize the input data D_IN depending on the quantization parameter QP. As will be described later, the quantization module 300 may generate a quantization parameter adjusted to improve a video quality of encoded data generated from the output data D_OUT. That is, the quantization module 300 may generate an adjusted quantization parameter adjusted to improve a video quality of data decoded from a bitstream, and may obtain the output data D_OUT by quantizing the input data D_IN depending on the adjusted quantization parameter. As illustrated in FIG. 1, the quantization module 300 may include the quantization parameter decision module 320 and a quantization processor 340.

The quantization parameter decision module 320 may decide a quantization parameter based on a characteristic of quantized coefficients. For example, the quantization parameter decision module 320 may quantize the input data D_IN of a frequency domain by using a given initial quantization parameter to generate the quantization coefficients and may increase or decrease the initial quantization parameter with reference to a characteristic of the generated quantization coefficients. That is, the initial quantization parameter may be increased or decreased based on a characteristic of the generated quantization coefficients, such that the increase or decrease would not occur or would be by a different amount or degree if the characteristic were different.

The quantization processor 340 may obtain the output data D_OUT by quantizing the input data D_IN depending on a quantization parameter.

The de-quantization module 400 and the inverse transformation module 500 may perform operations that are inverse to/of the quantization module 300 and the transformation module 200. For example, the de-quantization module 400 may de-quantize the output data D_OUT, and the inverse transformation module 500 may generate data of a spatial domain by inversely transforming data generated by the de-quantization module 400, that is, data of a frequency domain. The data generated by the inverse transformation module 500 may be decoded residual data.

The deblocking/SAO filter module 600 and the decoded frame buffer 700 may generate and store decoded frame data for inter prediction. The deblocking/SAO filter module 600 may filter data corresponding to a sum of the prediction data D_PRE and residual data de-quantized by the de-quantization module 400 and then inversely transformed by the inverse transformation module 500. Thus, errors due to blocks constituting one frame may decrease. This may mean that frame data indicating an image of a better quality are generated. The decoded frame buffer 700 may store frame data generated by the deblocking/SAO filter module 600 and may provide the stored frame data to the inter prediction module 900.

The intra prediction module 800 may generate intra prediction data based on data, which correspond to a sum of the prediction data D_PRE and residual data decoded by the de-quantization module 400 and then inversely transformed by the inverse transformation module 500, and the original data D_ORG. For example, the intra prediction module 800 may generate intra prediction data by performing intra-frame estimation and intra-frame prediction.

The inter prediction module 900 may generate inter prediction data based on frame data provided from the decoded frame buffer 700 and the original data D_ORG. For example, the inter prediction module 900 may generate inter prediction data by performing motion estimation and motion compensation.

One of the intra prediction data and inter prediction data may be selected by the control module 100 as the prediction data D_PRE and may be used to generate the residual data D_RES from the original data D_ORG.

In FIG. 1, the original data D_ORG may be image data included in one of multiple blocks constituting one frame of the original video data 5. For example, the original video data 5 including multiple frames may be encoded for each of multiple blocks of each of multiple frames. Thus, the original data D_ORG, the prediction data D_PRE, the residual data D_RES, the input data D_IN, and the output data D_OUT may correspond to one block. The quantization parameter decision module 320 of the quantization module 300 may decide a quantization parameter corresponding to a block. For example, the quantization parameter may be determined to have different values for different respective blocks.

Figure 2A:
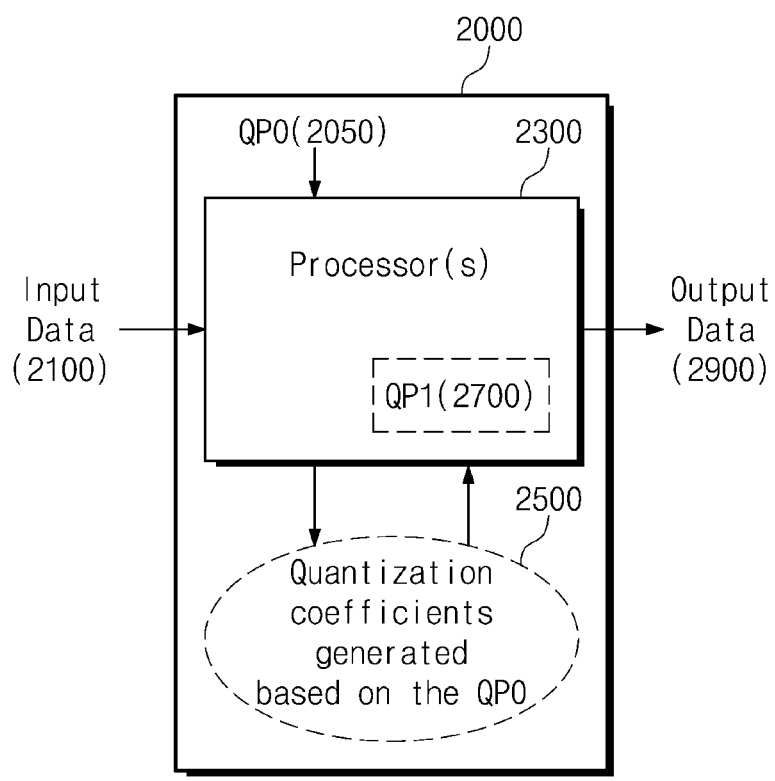
FIG. 2A illustrates a video encoding apparatus, according to an embodiment.

FIG. 2A indicates a video encoding apparatus, according to an embodiment.

A video encoding apparatus 2000 may encode video data and may output an encoded bitstream. The video encoding apparatus 2000 according to an embodiment may include all or a part (e.g., the quantization module 300 of FIG. 1) of the video encoding apparatus 10 of FIG. 1. Accordingly, the video encoding apparatus 2000 may perform all or a part of the operations of the video encoding apparatus 10 described with reference to FIG. 1.

The video encoding apparatus 2000 may include at least one processor 2300. An operation of the video encoding apparatus 2000 to be described below may be performed by the at least one processor 2300.

Input data 2100 may include transformation coefficients that are generated by performing frequency transformation on residual data generated with respect to original data, but is not limited thereto.

The video encoding apparatus 2000 may perform quantization on the input data 2100 by using an initial quantization parameter (QP0) 2050 and may generate quantization coefficients 2500.

The initial quantization parameter 2050 according to an embodiment may be a quantization parameter that is determined in advance depending on the input data 2100. For example, the initial quantization parameter 2050 may be a value that is basically determined for each coding unit or for each transformation unit. The video encoding apparatus 2000 according to an embodiment may decide the initial quantization parameter 2050 based on a bitrate of a bitstream generated by encoding original video data. In the case where a sufficient margin is present in a bitrate, the initial quantization parameter 2050 may be determined to be relatively small; if not, the initial quantization parameter 2050 may be determined to be relatively great. According to an embodiment, information about the initial quantization parameter 2050 may be encoded and transmitted to a video decoding apparatus in the form of a bitstream.

The video encoding apparatus 2000 may adjust the size of the initial quantization parameter 2050 with reference to (based on) the quantization coefficients 2500. The initial quantization parameter of the adjusted size may also be determined as a final quantization parameter (QP1) 2700 to be used for quantization of the input data 2100. The video encoding apparatus 2000 may quantize the input data 2100 by using the final quantization parameter 2700 and may obtain output data 2900. Below, an operation of the video encoding apparatus 2000 will be more fully described with reference to FIG. 2B.

Figure 2B:
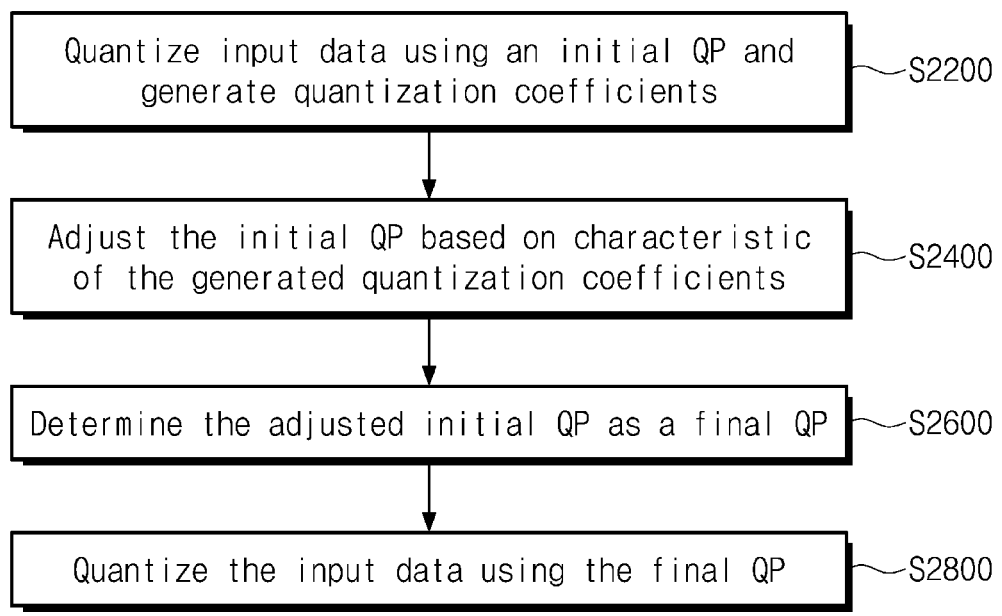
FIG. 2B is a flowchart illustrating a video encoding method performed in the video encoding apparatus of FIG. 2A, according to an embodiment.

FIG. 2B is a flowchart illustrating a video encoding method performed in a video encoding apparatus, according to an embodiment.

In operation S2200, the video encoding apparatus 2000 may perform quantization on input data by using an initial quantization parameter and may generate quantization coefficients. Below, it is assumed that the initial quantization parameter has a value of 22.

Figure 3:
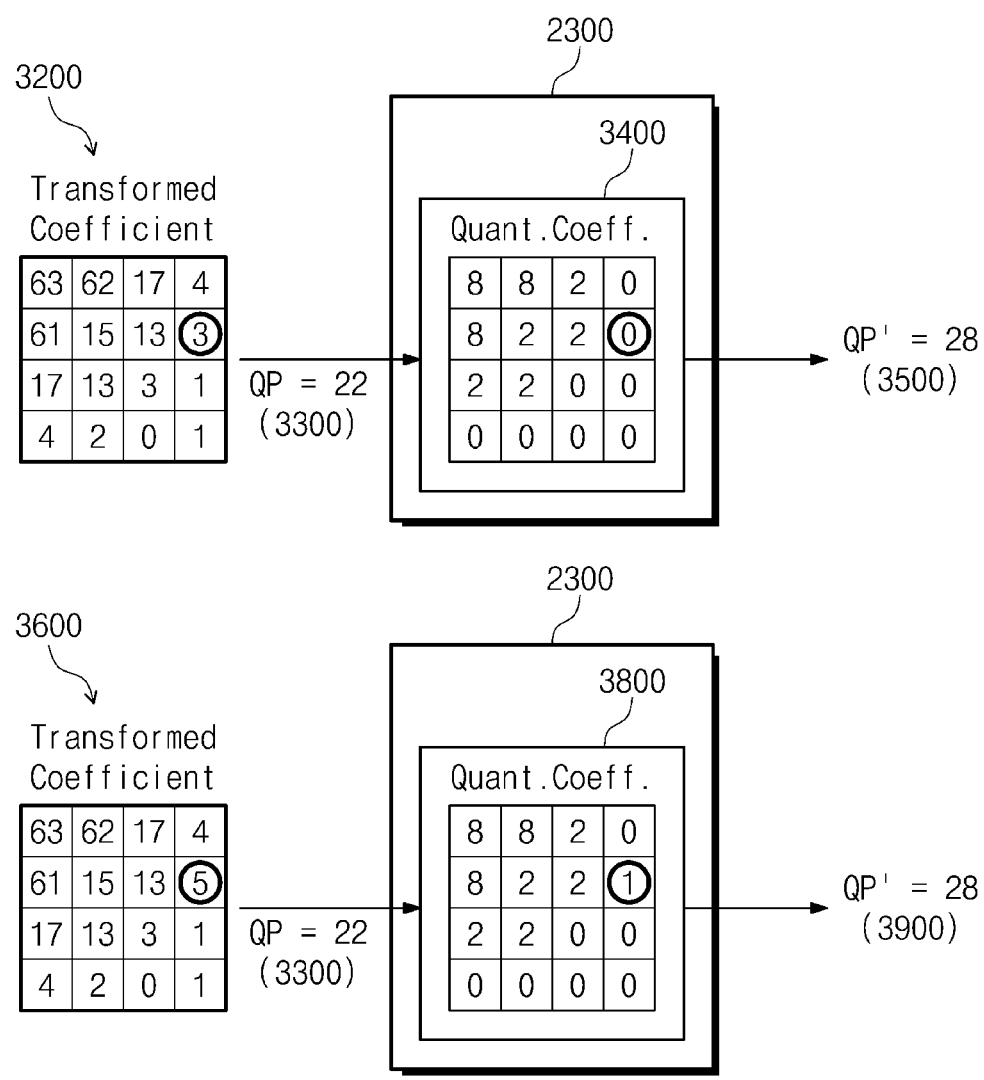
FIG. 3 is a conceptual diagram illustrating an operation of adjusting an initial quantization parameter with reference to (based on) a characteristic of quantization coefficients generated by using the initial quantization parameter, according to an embodiment.

Referring to FIG. 3, a transformed coefficient 3200 and a transformed coefficient 3600 indicate input data according to an embodiment. Each of the transformed coefficient 3200 and the transformed coefficient 3600 may be a coefficient that is obtained by performing frequency transformation on residual data generated with respect to original data. Each of the transformed coefficient 3200 and the transformed coefficient 3600 may be composed of 16 coefficients, and the 16 coefficients may be illustrated in the form of a two-dimensional arrangement (e.g., TC(i,j), 0<=i<4 and 0<=j<4) or in the form of a one-dimensional arrangement (e.g., TC(k), 0<=k<15). However, the composition and form of the transformed coefficient 3200 and the transformed coefficient 3600 may not be limited thereto.

A quantization coefficient 3400 and a quantization coefficient 3800 indicate results of quantizing the transformed coefficient 3200 and the transformed coefficient 3600 by using an initial quantization parameter 3300, respectively. Each of the quantization coefficient 3400 and the quantization coefficient 3800 may be composed of 16 coefficients, and the 16 coefficients may be illustrated in the form of a two-dimensional arrangement (e.g., QC(i,j), 0<=i<4 and 0<=j<4) or in the form of a one-dimensional arrangement (e.g., QC(k), 0<=k<15). However, the composition and form of the quantization coefficient 3400 and the quantization coefficient 3800 may not be limited thereto. Below, a coefficient of a (x,y)-th location may mean a value (i.e., A(x,y)) at the x-th row and the y-th column in a coefficient A(i,j) (0<=i<4 and 0<=j<4).

A quantization step $Q_{step}$ used to perform quantization may be obtained from the quantization parameter QP by using the following equation.

$$Q_{step} \approx 2^{\frac{QP-4}{6}} \quad \text{[Equation (1)]}$$

For example, a quantization step corresponding to an initial quantization parameter 3300 may be determined to be "8", and may increase to "16" if the initial quantization parameter increases to "28". Accordingly, an increase in the size of the quantization parameter may mean an increase in the size of the quantization step. Also, increasing a size of the quantization step two times may mean to increase the size of an existing quantization parameter to a size corresponding to the quantization step which is increased in size two times.

The quantization coefficient 3400 and the quantization coefficient 3800 may be obtained by quantizing the transformed coefficient 3200 and the transformed coefficient 3600 by using the following equation, respectively.

$Q_{coeff}$=lower bound($T_{coeff}$+($R_{coeff} \times Q_{step}$))/$Q_{step}$)($Q_{coeff}$:quantization coefficient,$T_{coeff}$:transformed coefficient,$R_{coeff}$:rounding offset for quantization, and $Q_{step}$:quantization step). [Equation (2)]

In operation S2400, the video encoding apparatus 2000 may adjust the size of the initial quantization parameter with reference to (based on) a characteristic of the quantization coefficients generated in operation S2200.

Returning to FIG. 3, the video encoding apparatus 2000 may increase the initial quantization parameter 3300 by 6 with reference to (based on) the quantization coefficient 3400 to decide the final quantization parameter 3500 (e.g., 28) to be used for quantization of the transformed coefficient 3200. For example, the video encoding apparatus 2000 may increase the initial quantization parameter 3300 by 6 with reference to (based on) the quantization coefficient 3800 to decide a final quantization parameter 3900 (e.g., 28) to be used for quantization of the transformed coefficient 3600.

In operation S2400, the video encoding apparatus 2000 may determine whether restoration data to be generated by restoring input data by using the initial quantization parameter and restoration data to be generated by restoring the input data by using another quantization parameter are the same as each other or different from each other within a reference range. The size of the other quantization parameter is greater than that of the initial quantization parameter. The video encoding apparatus 2000 may in advance determine whether pieces of restoration data to be generated by using different quantization parameters (e.g., an initial quantization parameter and another quantization parameter with an adjusted size) are the same as each other or are different from each other within a reference range. The video encoding apparatus may determine whether the pieces of restoration data to be generated are the same as each other or different from each other with reference to only the quantization parameters generated in operation S2200 without the process of generating restoration data actually and comparing the generated restoration data with corresponding data.

Figure 4A:
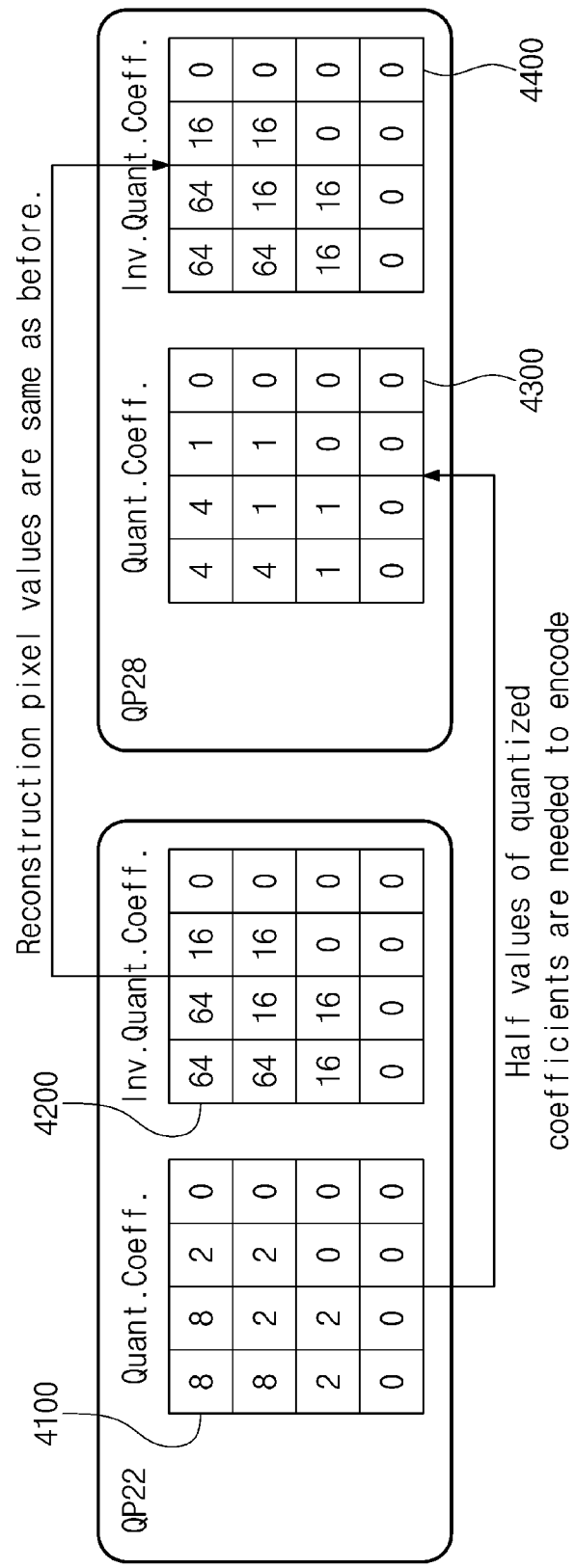
FIG. 4A illustrates a progression for describing the case where restoration data to be generated by using an initial quantization parameter and restoration data to be generated by using another quantization parameter are fully the same as each other, according to an embodiment. In the embodiment of FIG. 4A, the size of the other quantization parameter is greater than that of the initial quantization parameter.

Below, one embodiment will be more fully described with reference to FIG. 4A. Restoration data 4200 may be generated by performing inverse quantization on quantization coefficients 4100 that are generated by quantizing a transformed coefficient 4000 by using the initial quantization parameter. Restoration data 4400 may be generated by performing inverse quantization on quantization coefficient 4300 that is generated by quantizing the transformed coefficient 4000 by using another quantization parameter (e.g., 28) which is greater in size than that of the initial quantization parameter. The restoration data 4200 are the same as restoration data 4400.

Accordingly, the video encoding apparatus 2000 may decide another quantization parameter with a size greater than that of the initial quantization parameter as a final quantization parameter to be used for quantization of the transformed coefficient 4000, thereby improving efficiency to encode. That is, since the restoration data 4200 are the same as restoration data 4400, even though encoding and decoding are performed by using another quantization parameter with a size greater than that of the initial quantization parameter, degradation of an image may not occur compared with the case of performing encoding and decoding by using the initial quantization parameter.

Figure 4B:
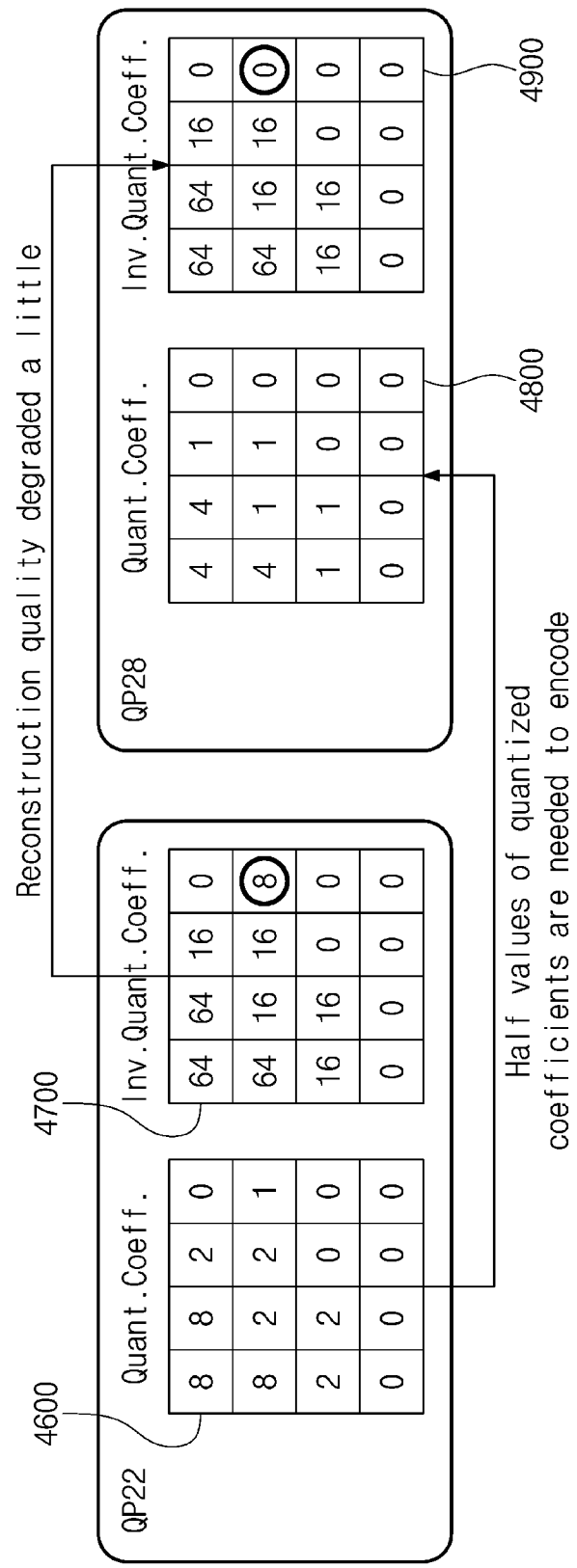
FIG. 4B illustrates a progression for describing the case where restoration data to be generated by using an initial quantization parameter and restoration data to be generated by using another quantization parameter are different from each other, according to an embodiment. In the embodiment of FIG. 4B, the size of the other quantization parameter is greater than that of the initial quantization parameter within a reference range.

Below, another embodiment will be more fully described with reference to FIG. 4B. Restoration data 4700 may be generated by performing inverse quantization on quantization coefficients 4600 that are generated by quantizing a transformed coefficient 4500 by using the initial quantization parameter. Restoration data 4900 may be generated by performing inverse quantization on quantization coefficient 4800 that is generated by quantizing the transformed coefficient 4500 by using another quantization parameter (e.g., 28) with a size greater than that of the initial quantization parameter. Since values at a (1, 3) location are "8" and "0", the restoration data 4700 and the restoration data 4900 are different from each other. However, even in this case, the video encoding apparatus 2000 may decide another quantization parameter with a size greater than that of the initial quantization parameter, as a final quantization parameter to be used for quantization of the transformed coefficient 4500, thereby improving efficiency to encode.

That is, in the case where a difference between the restoration data 4700 and the restoration data 4900 is within a reference range even though the restoration data 4700 and the restoration data 4900 do not coincide with each other, the video encoding apparatus 2000 may determine that a gain obtained from a decrease in a bitrate provides an advantage greater than the disadvantage from degradation of an image due to an increase in using another quantization parameter. According to an embodiment, the case where a difference between the restoration data 4700 and the restoration data 4900 is within a reference range may include the case where the number of different coefficients is small or different coefficients indicate a component of a high frequency band. However, cases when differences between restoration data, e.g., restoration data 4700 and restoration data 4900, is within a reference range, may not be limited thereto.

Figure 6:
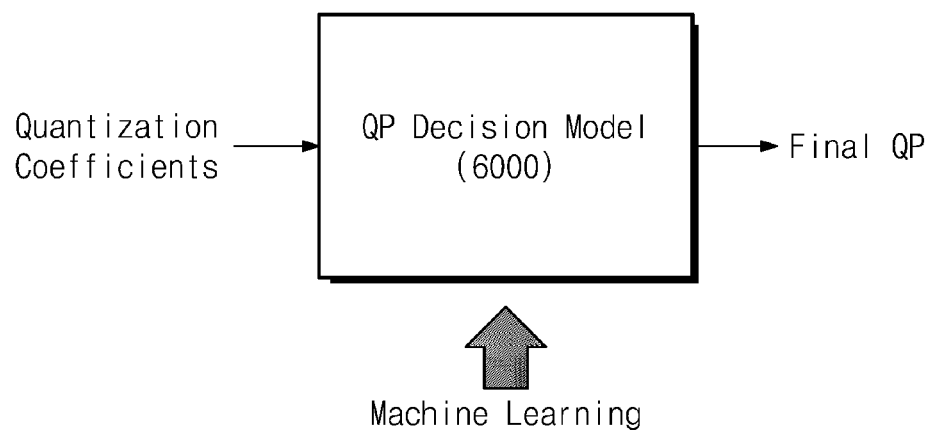
FIG. 6 illustrates a decision model for outputting a final quantization parameter based on a characteristic of quantization coefficients generated by using an initial quantization parameter, according to an embodiment.

According to another embodiment, the video encoding apparatus 2000 may adjust the size of the initial quantization parameter by using a decision model. Referring to FIG. 6, a decision model 6000 may receive the quantization coefficients generated in operation S2200 and may output a final quantization parameter in consideration of encoding efficiency and the degree of degradation of an image. The final quantization parameter may be a value that is obtained by increasing or decreasing the initial quantization parameter.

The decision model 6000 may be generated based on the machine learning. The machine learning may mean an algorithm technology for classifying/learning a characteristic of pieces of input data by itself. For example, the machine learning associated with the decision model 6000 may be performed by using any one of a principal component analysis (PCA) technique, a deep network learning technique, and a singular value decomposition (SVD) technique, using data associated with a lot of quantization coefficients as an input.

The machine learning associated with the decision model 6000 may be performed to decide a final quantization parameter for generating restoration data of a reference quality or higher corresponding to input data, based on information about quantization coefficients. For example, the machine learning associated with the decision model 6000 may include an operation of allowing the decision model 6000 to learn by using the quantization coefficient 3400 of FIG. 3 and the final quantization parameter 3500 corresponding to the quantization coefficient 3400. Also, the machine learning associated with the decision model 6000 may include an operation of allowing the decision model 6000 to learn by using the transformed coefficient 3600 of FIG. 3 and the final quantization parameter 3900 corresponding to the transformed coefficient 3600.

In the above manner, the machine learning associated with the decision model 6000 may be performed by using a myriad of quantization coefficients and a final quantization parameter corresponding thereto. As the machine learning is performed, the decision model 6000 may be consistently updated.

As described above, the video encoding apparatus 2000 may adjust the size of the initial quantization parameter without actually performing the process of inverse quantization, with reference to (based on) the quantization coefficients 4100 or only a characteristic associated with the quantization coefficients 4100. Accordingly, a complicated operation (e.g., calculating rate-distortion costs) performed to decide another quantization parameter may be omitted. A determination reference for adjusting the size of the initial quantization parameter, according to an embodiment, will be more fully described with reference to FIG. 5.

In operation S2600, the video encoding apparatus 2000 may decide the initial quantization parameter of the adjusted size as the final quantization parameter.

In operation S2800, the video encoding apparatus 2000 may quantize input data by using the final quantization parameter determined in operation S2600 and may obtain output data. The video encoding apparatus 2000 according to an embodiment may divide each of the quantization coefficients generated in operation S2200 by the same value "K" (K being a positive real number) and may decide the division result values as the output data. Here, "K" may be determined differently according to how much the initial quantization parameter is adjusted (e.g., an increment of a quantization step). Referring to FIGS. 4A and 4B, the video encoding apparatus 2000 may perform only an operation of dividing each of the quantization coefficients 4100 or the quantization coefficients 4600 generated in operation S2200 by "2", instead of performing an operation of quantizing the transformed coefficient 4000 or the transformed coefficient 4500 by using the final quantization parameter determined. Accordingly, the video encoding apparatus 2000 may decide the quantization coefficient 4300 or the quantization coefficient 4800 thus obtained as the output data.

Figure 5:
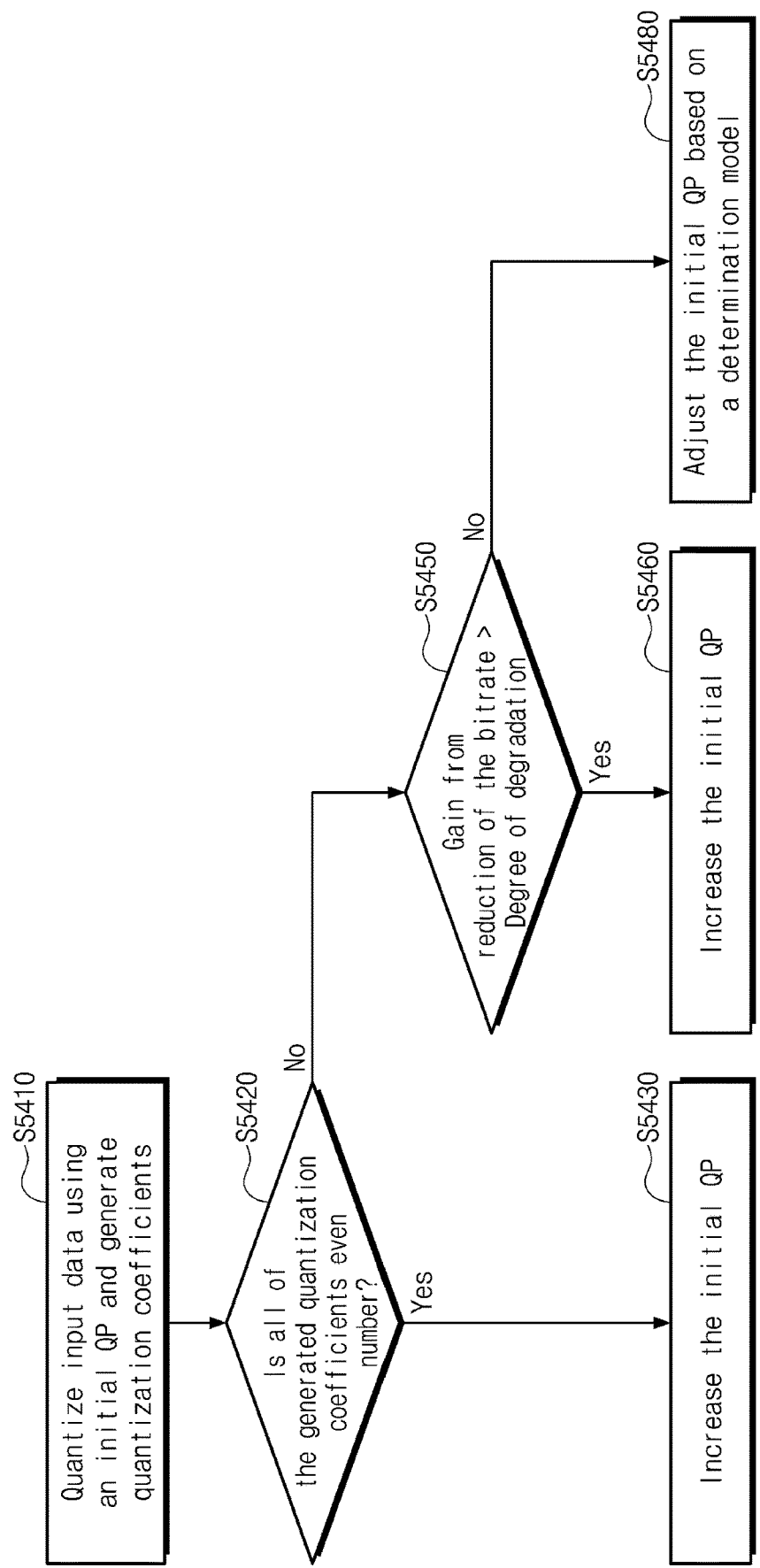
FIG. 5 is a flowchart illustrating a method for deciding a final quantization parameter with reference to (based on) quantization coefficients generated by using an initial quantization parameter, according to an embodiment.

FIG. 5 is a flowchart illustrating a method for deciding a final quantization parameter with reference to (based on) quantization coefficients generated by using an initial quantization parameter, according to an embodiment.

Operation S5410, operation S5420, operation S5430, operation S5450, operation S5460, and operation S5480 of FIG. 5 may belong to operation S2400 of FIG. 2B. However, operation S5410, operation S5420, operation S5430, operation S5450, operation S5460, and operation S5480 of FIG. 5 may not be essential components of operation S2400 of FIG. 2B. The order of operation S5410, operation S5420, operation S5430, operation S5450, operation S5460, and operation S5480 of FIG. 5 may be changed. For example, one or more of operation S5410, operation S5420, operation S5430, operation S5450, operation S5460, and operation S5480 may be omitted in operation S2400, or any other operation except for operation S5410, operation S5420, operation S5430, operation S5450, operation S5460, and operation S5480 may be added to operation S2400.

In operation S5410, the video encoding apparatus 2000 may perform quantization on input data by using an initial quantization parameter and may generate quantization coefficients.

In operation S5420, the video encoding apparatus 2000 may determine whether all the quantization coefficients generated in operation S5410 are an even number. The case where all the quantization coefficients are an even number may mean that another quantization parameter (e.g., a quantization parameter (QP) 28 of FIG. 4A) for compressing input data without data loss exists, and the other quantization parameter has a greater value than an initial quantization parameter. If all the quantization coefficients generated in operation S5410 are an even number, operation S5430 may be performed; if not, another condition may be determined in operation S5450.

In operation S5430, the video encoding apparatus 2000 may increase the size of the initial quantization parameter. For example, if a quantization coefficient with a smallest size among the quantization coefficients generated in operation S5410 is 2n (n being a positive integer), the video encoding apparatus 2000 may increase a quantization step as much as $2^n$ times. Returning to FIG. 3, since all the quantization coefficients 3400 generated by quantizing the transformed coefficient 3200 by using the initial quantization parameter 3300 are an even number and a quantization coefficient with the smallest size among the quantization coefficients 3400 is "2", the video encoding apparatus 2000 may increase the initial quantization parameter to a value (e.g., 28) corresponding to the size of a quantization step (e.g., 16), which is two times a size (e.g., 8) of the initial quantization parameter 3300.

In operation S5450, the video encoding apparatus 2000 may determine whether a gain obtained from reduction of the bitrate provides an advantage that outweighs the disadvantage from degradation of an image due to an increase in the initial quantization parameter, based on only a characteristic of quantization coefficients. Accordingly, the video encoding apparatus 2000 may determine whether to adjust the size of the initial quantization parameter, without calculating rate-distortion costs.

In operation S5420, the video encoding apparatus 2000 may determine whether the number of quantization coefficients, which are an odd number, from among the quantization coefficients generated in operation S5410 is not more than a reference. Returning to FIG. 3, the video encoding apparatus 2000 may determine whether the number of quantization coefficients, which are an odd number, from among 16 quantization coefficients generated is not more than 3. A coefficient at (1, 3) among the quantization coefficient 3800 generated by quantizing the initial quantization parameter 3300 is an odd number being "1". This may mean that loss occurs with regard to the input data (i.e., an image degrades) in the case of quantizing the input data by using another quantization parameter with a value greater than that of the initial quantization parameter 3300.

However, as described above, in the case where the number of quantization coefficients, which are an odd number, from among quantization coefficients obtained by using an initial quantization parameter is smaller than a reference, the video encoding apparatus 2000 may determine that a gain obtained from reduction of a bitrate provides more advantage than the disadvantage from degradation of an image due to an increase in the initial quantization parameter is considered.

However, exceptionally, even though the number of quantization coefficients, which are an odd number, from among quantization coefficients is more than a reference, if most of the odd coefficients are coefficients indicating a component of a high frequency band, the video encoding apparatus 2000 may determine that the degree of degradation of an image, which a person feels, is minor. The reason is that a person is less sensitive to degradation of an image in a high frequency band than in a low frequency band. Even in this case, the video encoding apparatus 2000 may determine that a gain obtained from reduction of the bitrate provides an advantage that outweighs the disadvantage from degradation of an image due to an increase in the initial quantization parameter is considered.

If it is determined that a gain obtained from reduction of the bitrate provides an advantage that outweighs the disadvantage from degradation of an image due to an increase in the initial quantization parameter, operation S5460 may be performed; if not, operation S5480 may be performed.

In operation S5460, the video encoding apparatus 2000 may increase the size of the initial quantization parameter. For example, if a quantization coefficient with the smallest size among the quantization coefficients generated in operation S5410 is 2n, the video encoding apparatus 2000 may increase a quantization step as much as $2^n$ times. Returning to FIG. 3, the quantization coefficient 3800 is composed of 16 quantization coefficients generated by quantizing the transformed coefficient 3600 by using the initial quantization parameter 3300. Only "1" of the 16 quantization coefficients among the quantization coefficient 3800 is an odd number. Additionally, the smallest of the 16 quantization coefficients among the quantization coefficient 3800 with an even number is "2". Accordingly, the video encoding apparatus 2000 may increase the initial quantization parameter to a value (e.g., 28) corresponding to the size of a quantization step (e.g., 16), which is two times a size (e.g., 8) of the initial quantization parameter 3300.

In operation S5480, the video encoding apparatus 2000 may increase the size of the initial quantization parameter by using a decision model. For example, the video encoding apparatus 2000 may output a final quantization parameter corresponding to the quantization coefficients generated in operation S5410 by using a decision model (e.g., 6000 of FIG. 6) learned based on a machine learning technique.

Figure 7:
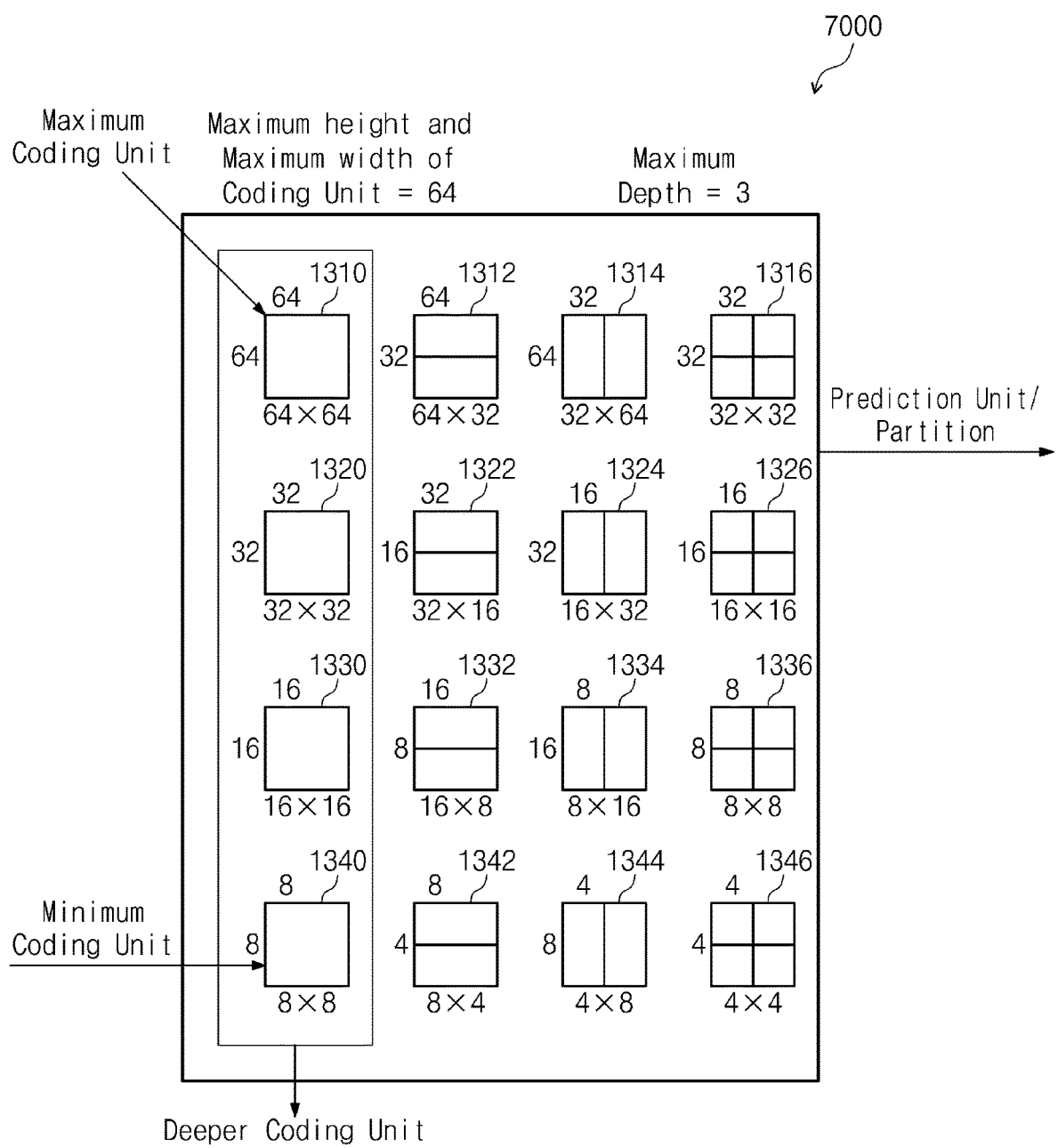
FIG. 7 illustrates a coding unit/partition for each depth according to an embodiment.

FIG. 7 illustrates a coding unit/partition for each depth, according to an embodiment.

The video encoding apparatus 2000 according to an embodiment may use a coding unit based on a layer, for the purpose of performing encoding in consideration of an image characteristic. The maximum height, the maximum width, and the maximum depth of the coding unit may be adaptively determined according to a characteristic of an image and may be variously set according to requirement of a user. The size of the coding unit for each depth may be determined according to the maximum size of a preset coding unit.

A layer structure 7000 of the coding unit according to an embodiment illustrates the case where the maximum height and the maximum width of the coding unit are "64" and the maximum depth is "3". The maximum depth indicates the total number of times of division from the maximum coding unit to the minimum coding unit. Since a depth becomes deeper along a vertical axis of the layer structure 7000 of the coding unit according to an embodiment, each of a height and a width of a coding unit for each depth is divided. Also, a prediction unit/partition for prediction encoding of a coding unit for each depth is illustrated along a horizontal axis of the layer structure 7000 of the coding unit.

A coding unit 1310 that is the maximum coding unit of the layer structure 7000 of the coding unit is "0" in depth and the size of the coding unit, that is, the height by width is 64×64. A depth becomes deeper along the vertical axis, and a coding unit 1320 of depth 1, which is 32×32 in size, a coding unit 1330 of depth 2, which is 16×16 in size, and a coding unit 1340 of depth 3, which is 8×8 in size exist. The coding unit 1340 of depth 3, which is 8×8 in size is the minimum coding unit.

Prediction units/partitions of a coding unit are arranged along the horizontal axis for each depth. If the coding unit 1310 of depth 0, which is 64×64 in size, is a prediction unit, the prediction unit may be partitioned into a prediction of 64×64 in size included in the coding unit 1310 of 64×64 in size, predictions 1312 of 64×32 in size, predictions 1314 of 32×64 in size, and predictions 1316 of 32×32 in size.

Likewise, if the coding unit 1320 of depth 1, which is 32×32 in size, is a prediction unit, the prediction unit may be partitioned into a prediction of 32×32 in size included in the coding unit 1320 of 32×32 in size, predictions 1322 of 32×16 in size, predictions 1324 of 16×32 in size, and predictions 1326 of 16×16 in size.

Likewise, if the coding unit 1330 of depth 2, which is 16×16 in size, is a prediction unit, the prediction unit may be partitioned into a prediction of 16×16 in size included in the coding unit 1330 of 16×16 in size, predictions 1332 of 16×8 in size, predictions 1334 of 8×16 in size, and predictions 1336 of 8×8 in size.

Likewise, if the coding unit 1340 of depth 3, which is 8×8 in size, is a prediction unit, the prediction unit may be partitioned into a prediction of 8×8 in size included in the coding unit 1340 of 8×8 in size, predictions 1342 of 8×4 in size, predictions 1344 of 4×8 in size, and predictions 1346 of 4×4 in size.

The number of coding units for each depth for including data of the same range and size increases as a depth becomes deeper. For example, four coding units of depth 2 are necessary with regard to data that one coding unit of depth 1 includes.

Figure 8:
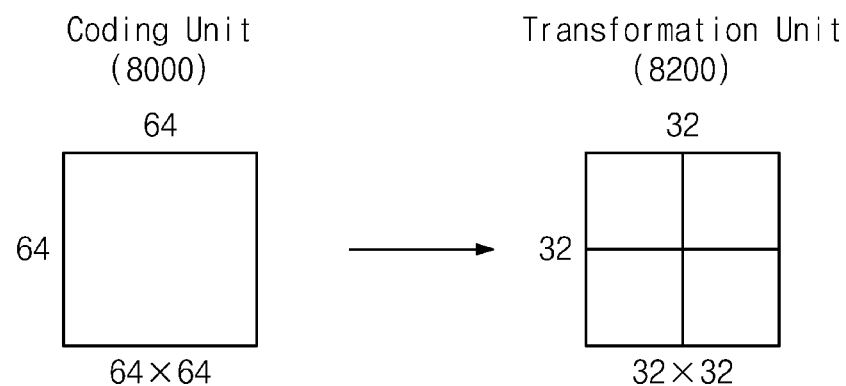
FIG. 8 illustrates a relationship between a coding unit and a transformation unit, according to an embodiment.

FIG. 8 illustrates a relationship between a coding unit and a transformation unit, according to an embodiment.

The video encoding apparatus 2000 according to an embodiment may encode or decode an image by a coding unit with a size smaller than or the same as the maximum coding unit, with respect to each of the maximum coding units. The size of a transformation unit for transformation of an encoding process may be selected based on a data unit, which is not greater than each coding unit.

For example, when a current coding unit 8000 is 64×64 in size, the video encoding apparatus 2000 according to an embodiment may perform transformation by using a transformation unit 8200 of 32×32 in size.

Also, the video encoding apparatus 2000 according to an embodiment may encode data of the coding unit 8000 of 64×64 in size through transformation with each of transformation units of 32×32, 16×16, 8×8, and 4×4 in size and may then select a transformation unit in which a difference between original data and the coded data is the smallest.

Residual data that correspond to a difference between original data and prediction data may be included in a transformation unit. The video encoding apparatus 2000 according to an embodiment may perform frequency transformation on residual data of the transformation unit to generate a transformed coefficient (e.g., 3200 or 3600 of FIG. 3). Also, the video encoding apparatus 2000 may quantize a transformed coefficient that is generated based on a quantization parameter determined by the above-described quantization parameter deciding method.

Figure 9:
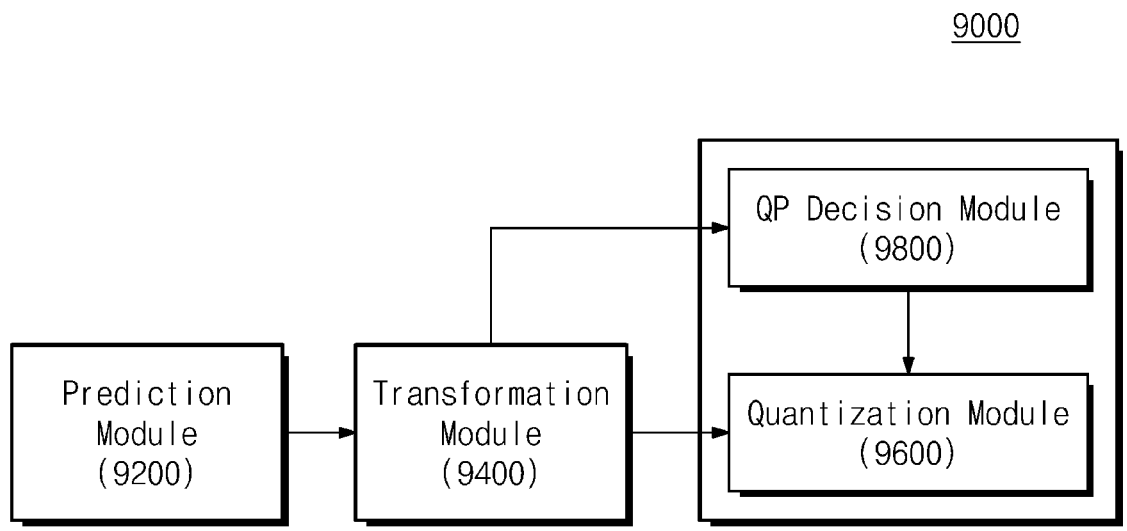
FIG. 9 illustrates a block diagram of another video encoding apparatus, according to an embodiment.

FIG. 9 illustrates a block diagram of another video encoding apparatus, according to an embodiment.

A video encoding apparatus 9000 may include a prediction module 9200, a transformation module 9400, a quantization module 9600, and a quantization parameter decision module 9800. The video encoding apparatus 9000 illustrates an embodiment of the video encoding apparatus 10 of FIG. 1. Accordingly, even though omitted below, the above description given with regard to the video encoding apparatus 10 of FIG. 1 may be applied to the video encoding apparatus 9000 of FIG. 9. Below, an operation of the video encoding apparatus 9000 will be described with reference to a flowchart of FIG. 10.

Figure 10:
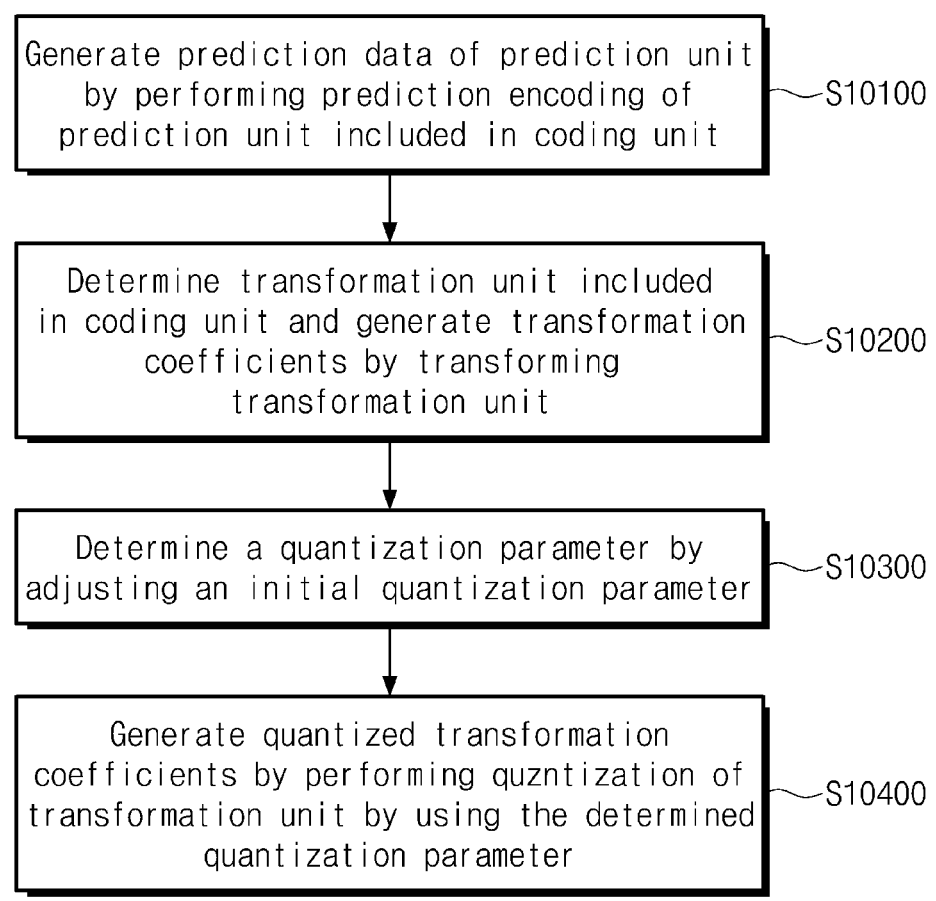
FIG. 10 is a flowchart illustrating a method in which the video encoding apparatus encodes an image.

FIG. 10 is a flowchart illustrating a method in which a video encoding apparatus encodes an image.

In operation S10100, the prediction module 9200 may perform intra prediction or motion prediction on at least one prediction unit of a current coding unit and may generate prediction data for each prediction unit. The prediction data of the prediction unit generated as the motion prediction result may mean residual data between a current prediction unit and a reference prediction unit.

In operation S10200, the transformation module 9400 may decide at least one transformation unit of a tree structure, on which transformation will be performed, with respect to the current coding unit including the prediction data generated by the prediction module 9200. The transformation module 9400 may perform transformation on at least one transformation unit included in the current coding unit to generate a transformed coefficient (e.g., 3200 or 3600 of FIG. 3).

In operation S10300, the quantization parameter decision module 9800 may decide a final quantization parameter by adjusting the size of an initial quantization parameter with respect to the at least one transformation unit. In operation S10200, in the case where multiple transformation units associated with the current coding unit are determined, the final quantization parameter may be determined differently with respect to the multiple transformation units. For example, the quantization parameter decision module 9800 may perform quantization on a current transformation unit by using the initial quantization parameter and may adjust the size of the initial quantization parameter with reference to (based on) the generated, quantized transformed coefficients. The initial quantization parameter of the adjusted size may be determined as the final quantization parameter for the current transformation unit. An operation in which the quantization parameter decision module 9800 decides a final quantization parameter is more fully described with reference to FIGS. 2A to 6.

In operation S10400, the quantization module 9600 may perform quantization on the transformed coefficients by using the quantization parameter determined by the quantization parameter decision module 9800 and may generate quantized transformed coefficients.

Figure 11:
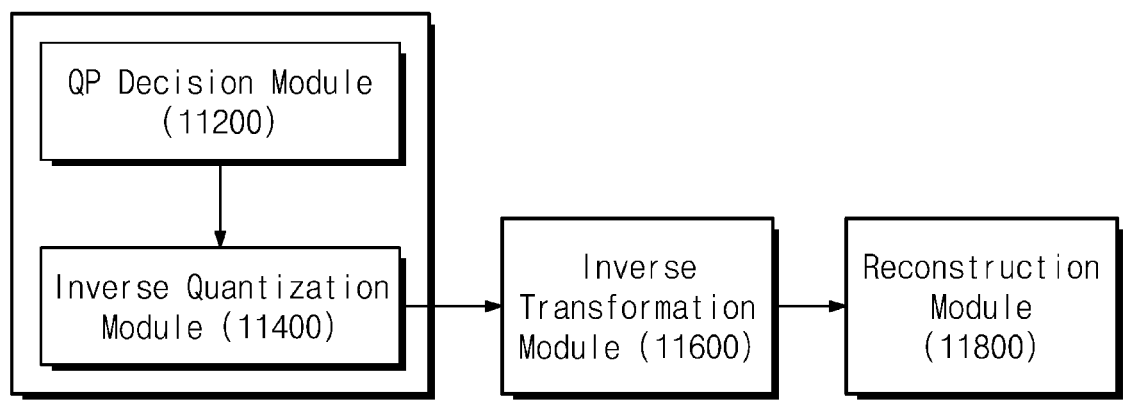
FIG. 11 illustrates a block diagram of another video decoding apparatus, according to an embodiment.

FIG. 11 illustrates a block diagram of another video decoding apparatus, according to an embodiment.

A video decoding apparatus 11000 may receive a bitstream generated in the video encoding apparatus 9000 and may decode the received bitstream to restore an image.

The video decoding apparatus 11000 according to an embodiment may include a quantization parameter decision module 11200, an inverse quantization module 11400, an inverse transformation module 11600, and a reconstruction module 11800. Below, an operation of the video decoding apparatus 11000 will be described with reference to a flowchart of FIG. 12.

Figure 12:
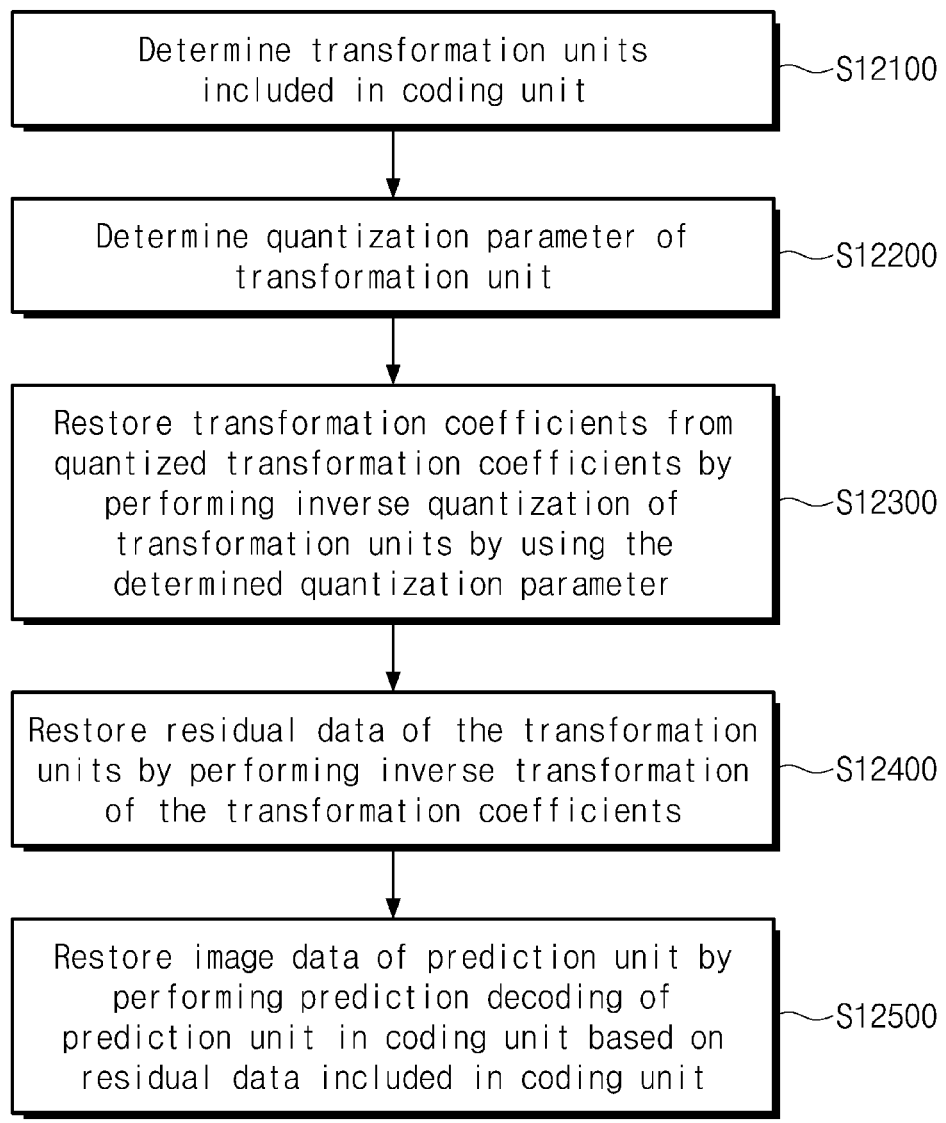
FIG. 12 is a flowchart illustrating a method in which the video decoding apparatus decodes an image.

FIG. 12 is a flowchart illustrating a method in which a video decoding apparatus decodes an image.

In operation S12100, the quantization parameter decision module 11200 may determine at least one transformation unit included in a current coding unit.

In operation S12200, the quantization parameter decision module 11200 may determine a quantization parameter of the at least one transformation unit thus determined. In operation S12100, in the case where multiple transformation units associated with the current coding unit are determined, the quantization parameter may be determined differently with respect to different of the multiple transformation units, respectively. The quantization parameter decision module 11200 according to an embodiment may determine another quantization parameter of the current transformation unit, based on a difference value with an initial quantization parameter received from a bitstream. According to an embodiment, the initial quantization parameter may be obtained from a header of a coding unit containing information about a coding unit to which the current transformation unit belongs.

In operation S12300, the inverse quantization module 11400 may perform inverse quantization on the at least one transformation unit by using the quantization parameter determined by the quantization parameter decision module 11200. Transformed coefficients may be restored through the inverse quantization, and the restored transformed coefficients may be referred to as restoration coefficients. First restoration coefficients may be generated by using a first quantization parameter. Second restoration coefficients may be generated by using a second quantization parameter, such as the final quantization parameter In operation S12400, the inverse transformation module 11600 may perform inverse transformation on the transformed coefficients restored by the inverse quantization module 11400 to restore residual data included in a transformation unit.

In operation S12500, the reconstruction module 11800 may perform intra prediction or motion compensation on the at least one prediction unit of the current coding unit and may restore image data based on the residual data restored in operation S12400 for each prediction unit.

Figure 13:
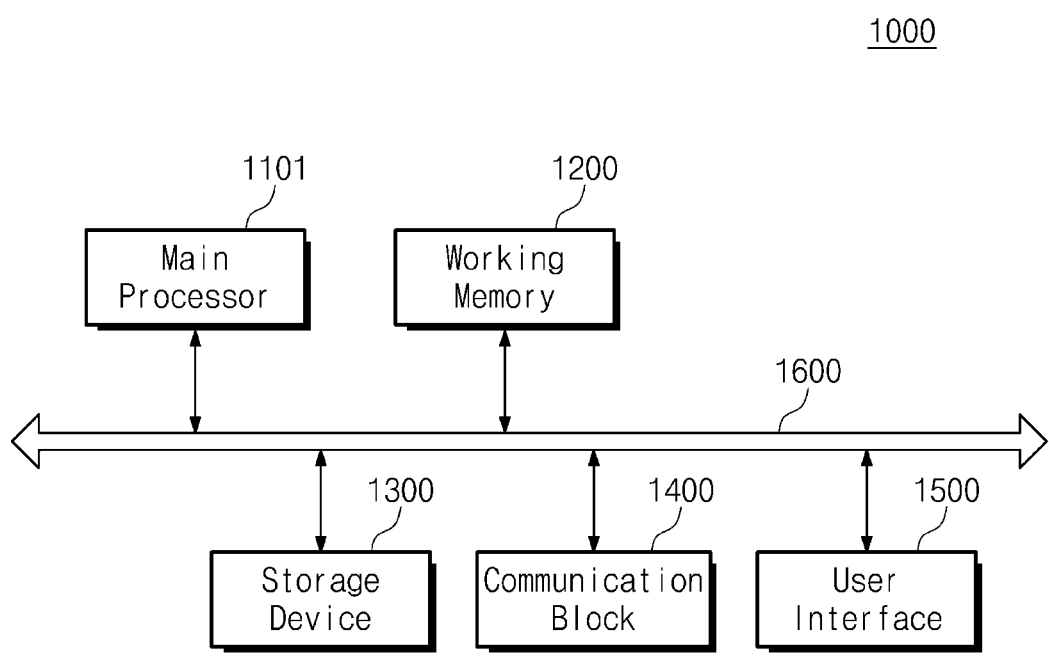
FIG. 13 illustrates a block diagram of an exemplary configuration of an electronic system that performs a video encoding method and a video decoding method, according to an embodiment.

FIG. 13 illustrates a block diagram of an exemplary configuration of an electronic system that performs a video encoding method and a video decoding method, according to an embodiment.

An electronic system 1000 may include a main processor 1101, a working memory 1200, a storage device 1300, a communication block 1400, a user interface 1500, and a bus 1600. For example, the electronic system 1000 may be one of electronic devices such as a desktop computer, a laptop computer, a tablet computer, a smartphone, a wearable device, a video game console, a workstation, a server, and an electric vehicle. The electronic system 10000 according to an embodiment may include at least one of the video encoding apparatus described with reference to FIGS. 1 to 9 or the video decoding apparatus of FIG. 10. For example, the electronic system 1000 may include the video encoding apparatus 2000 of FIG. 2A but is not limited thereto.

The main processor 1101 may control overall operations of the electronic system 1000. The main processor 1101 may process various kinds of arithmetic operations and/or logical operations. To this end, the main processor 1101 may include a special-purpose logic circuit (e.g., a field programmable gate array (FPGA) or application specific integrated chips (ASICs)). For example, the main processor 1101 may include one or more processor cores and may be implemented with a general-purpose processor, a special-purpose processor, or an application processor.

In an embodiment, the main processor 1101 may perform the above-described video encoding method by executing the instructions stored in the storage device 1300. For example, the main processor 1101 may determine a quantization parameter for input data by using the quantization parameter determining method described with reference to FIG. 5 and may encode the input data by using the determined quantization parameter.

The main processor 11010 may include a GPU (not illustrated). For example, the GPU may execute a program instruction associated with graphics processing. The GPU may receive graphic data from the outside and may transmit the graphic data processed by the GPU to the outside. In an embodiment, the GPU may perform the video encoding method described with reference to FIGS. 1 to 9. For example, the GPU may generate a bitstream by encoding original data received from the outside.

The working memory 1200 may store data to be used in an operation of the electronic system 1000. For example, the working memory 1200 may temporarily store data that are processed or will be processed by the main processor 1101. The working memory 1200 may temporarily store a video bitstream generated by the main processor 1101 or a video bitstream to be processed by the main processor 1101. The working memory 1200 may include a volatile memory, such as a dynamic random access memory (DRAM), a synchronous DRAM (SDRAM), or the like, and/or a nonvolatile memory, such as a phase-change RAM (PRAM), a magneto-resistive RAM (MRAM), a resistive RAM (ReRAM), a ferroelectric RAM (FRAM), or the like.

The storage device 1300 may include at least one memory device and a controller. The memory device of the storage device 1300 may store data regardless of power supply. For example, the storage device 1300 may include a nonvolatile memory device such as a flash memory, a PRAM, an MRAM, a ReRAM, a FRAM, or the like. For example, the storage device 1300 may include a storage medium such as a solid state drive (SSD), card storage, embedded storage, or the like. According to an embodiment, the storage device 1300 may store a bitstream that is generated by encoding the above-described original data or video data.

The communication block 1400 may communicate with an external device/system of the electronic system 1000. For example, the communication block 1400 may support at least one of various wireless communication protocols such as long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID) and/or at least one of various wired communication protocols such as transfer control protocol/Internet protocol (TCP/IP), universal serial bus (USB), and Firewire.

The user interface 1500 may perform communication arbitration between a user and the electronic system 1000. For example, the user interface 1500 may include input interfaces such as a keyboard, a mouse, a keypad, a button, a touch panel, a touch screen, a touch pad, a touch ball, a camera, a microphone, a gyroscope sensor, and a vibration sensor. For example, the user interface 1500 may include output interfaces such as a liquid crystal display (LCD) device, a light emitting diode (LED) display device, an organic LED (OLED) display device, an active matrix OLED (AMOLED) display device, a speaker, and a motor.

The bus 1600 may provide a communication path between the components of the electronic system 1000. The components of the electronic system 1000 may exchange data with each other based on a bus format of the bus 1600. For example, the bus format may include one or more of various interface protocols such as USB, small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), and universal flash storage (UFS).

Meanwhile, the video encoding method and the video decoding method, which are described above, may be implemented with a computer-readable code in a computer-readable recording medium. The computer-readable recording medium may include all kinds of storage devices in which data are stored. Examples of the computer-readable recording medium include read-only memories (ROMs), random-access memories (RAMs), CD-ROMs, magnetic tapes, floppy disks, optical data storage devices, and carrier waves (such as data transmission through the Internet). Also, in the computer-readable recording medium, a program or codes, which a computer can read out, may be stored and executed in a distributed manner.

The above descriptions are intended to provide exemplary configurations and operations for implementing the inventive concepts described herein. The scope and spirit of the present disclosure may include implementations capable of being obtained by changing or modifying simply the above embodiments, in addition to the above-described embodiments. Also, the scope and spirit of the present disclosure may include implementations capable of being accomplished by changing or modifying the above-described embodiments afterwards easily.

What is claimed is:

1. A video encoding apparatus which includes at least one processor, wherein the at least one processor is configured to:
   adjust a size of a first quantization parameter with reference to a characteristic of quantization coefficients generated from input data by using the first quantization parameter;
   determine the first quantization parameter of the adjusted size as a final quantization parameter; and
   quantize the input data by using the final quantization parameter to generate output data
   wherein, if first restoration data to be generated by restoring the input data by using the first quantization parameter and second restoration data to be generated by restoring the input data by using a second quantization parameter are the same as each other or are different from each other within a reference range is determined with reference to the characteristic of the quantization coefficients generated by using the first quantization parameter, the at least one processor increases the size of the first quantization parameter to a size of the second quantization parameter to obtain the final quantization parameter, and
   wherein the size of the second quantization parameter is greater than the size of the first quantization parameter.

2. The video encoding apparatus of claim 1, wherein, if all the quantization coefficients generated by using the first quantization parameter are an even number, the at least one processor determines that the first restoration data and the second restoration data are the same as each other.

3. The video encoding apparatus of claim 2, wherein the second quantization parameter is a value corresponding to a quantization step, a size of which is two times a size of a quantization step corresponding to the first quantization parameter.

4. The video encoding apparatus of claim 1, wherein, if a number of quantization coefficients, which are an odd number, from among the quantization coefficients generated by using the first quantization parameter is not more than a reference, the at least one processor determines that the first restoration data and the second restoration data are different from each other within the reference range.

5. The video encoding apparatus of claim 1, wherein, if quantization coefficients, which are an odd number, from among the quantization coefficients generated by using the first quantization parameter are coefficients indicating a component of a high frequency band, the at least one processor determines that the first restoration data and the second restoration data are different from each other within the reference range.

6. The video encoding apparatus of claim 1, wherein the at least one processor is further configured to adjust the first quantization parameter by using a decision model that is generated based on machine learning, and
wherein the decision model receives the quantization coefficients generated by using the first quantization parameter to output the final quantization parameter.

7. The video encoding apparatus of claim 6, wherein the decision model is generated by using at least one technique of a principal component analysis (PCA) technique, a deep network learning technique, and a singular value decomposition (SVD) technique.

8. A video encoding method which is performed by at least one processor, the method comprising:
performing quantization on input data by using a first quantization parameter to generate quantization coefficients;
adjusting a size of the first quantization parameter with reference to a characteristic of the quantization coefficients generated by using the first quantization parameter;
determining the first quantization parameter of the adjusted size as a final quantization parameter; and
quantizing the input data by using the final quantization parameter to generate output data,
wherein the adjusting of the size of the first quantization parameter includes:
determining whether first restoration data to be generated by restoring the input data by using the first quantization parameter and second restoration data to be generated by restoring the input data by using a second quantization parameter are the same as each other or are different from each other within a reference range, with reference to the characteristic of the quantization coefficients generated by using the first quantization parameter; and
increasing the size of the first quantization parameter to a size of the second quantization parameter to obtain the final quantization parameter if it is determined that the first restoration data and the second restoration data are the same or are different from each other within a reference range,
wherein the size of the second quantization parameter is greater than the size of the first quantization parameter.

9. The method of claim 8, wherein the determining includes:
determining that the first restoration data and the second restoration data are the same as each other, if all the quantization coefficients generated by using the first quantization parameter are an even number.

10. The method of claim 9, wherein the second quantization parameter is a value corresponding to a quantization step, a size of which is two times a size of a quantization step corresponding to the first quantization parameter.

11. The method of claim 8, wherein the determining includes:
determining that the first restoration data and the second restoration data are different from each other within the reference range, if a number of quantization coefficients, which are an odd number, from among the quantization coefficients generated by using the first quantization parameter is not more than a reference.

12. The method of claim 8, wherein the determining includes:
determining that the first restoration data and the second restoration data are different from each other within the reference range, if quantization coefficients, which are an odd number, from among the quantization coefficients generated by using the first quantization parameter are coefficients indicating a component of a high frequency band.

13. The method of claim 8, wherein the adjusting of the size of the first quantization parameter includes:
adjusting the first quantization parameter by using a decision model that is generated based on machine learning.

14. The method of claim 13, wherein the decision model is generated by using at least one technique of a principal component analysis (PCA) technique, a deep network learning technique, and a singular value decomposition (SVD) technique.

15. A video encoding method which is performed by at least one processor, the method comprising:
determining at least one transformation unit associated with a coding unit;
performing frequency transformation on pieces of residual data included in the at least one transformation unit to generate transformed coefficients associated with the at least one transformation unit;
performing quantization on the transformed coefficients by using a first quantization parameter to generate quantization coefficients;
adjusting a size of the first quantization parameter with reference to a characteristic of the quantization coefficients generated by using the first quantization parameter, to determine a final quantization parameter; and
quantizing the transformed coefficients by using the determined final quantization parameter,
wherein the determining of the final quantization parameter includes:
determining whether first restoration coefficients to be generated by restoring the transformed coefficients by using the first quantization parameter and second restoration coefficients to be generated by restoring the transformed coefficients by using a second quantization parameter are the same as each other or are different from each other within a reference range, with reference to the characteristic of the quantization coefficients generated by using the first quantization parameter; and increasing the size of the first quantization parameter to a size of the second quantization parameter to obtain the final quantization parameter if it is determined that the first restoration coefficients and the second restoration coefficients are the same as each other or are different from each other within the reference range, wherein the size of the second quantization parameter greater than the size of the first quantization parameter.

16. The method of claim 15, wherein the determining includes:

determining that the first restoration coefficients and the second restoration coefficients are the same as each other or are different from each other within the reference range, if all the quantization coefficients generated by using the first quantization parameter are an even number or a number of quantization coefficients, which are an odd number, from among the quantization coefficients generated by using the first quantization parameter is not more than a reference.

17. The method of claim 15, wherein, if a plurality of transformation units associated with the coding unit are determined, the final quantization parameter is determined differently with respect to different of the plurality of transformation units, respectively.

* * * * *